(12) United States Patent
Moreillon

(10) Patent No.: US 8,175,072 B2
(45) Date of Patent: May 8, 2012

(54) PROCESS FOR THE GENERATION OF PACKETS FOR AT LEAST ONE MOBILE RECEIVER

(75) Inventor: Guy Moreillon, Bioley-Orjulaz (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 908 days.

(21) Appl. No.: 11/790,566

(22) Filed: Apr. 26, 2007

(65) Prior Publication Data

US 2007/0253392 A1     Nov. 1, 2007

(30) Foreign Application Priority Data

Apr. 27, 2006   (EP) ..................................... 06113205

(51) Int. Cl.
*H04Q 7/24* (2006.01)
(52) U.S. Cl. .......................... 370/345; 370/338; 370/431
(58) Field of Classification Search .................. 370/321, 370/331, 335, 338, 345, 350, 431, 537
See application file for complete search history.

(56) References Cited

U.S. PATENT DOCUMENTS

| | | | | |
|---|---|---|---|---|
| 2005/0084108 A1* | 4/2005 | Durand et al. | ................. | 380/259 |
| 2005/0105486 A1* | 5/2005 | Robinett et al. | ............. | 370/321 |
| 2005/0105886 A1* | 5/2005 | Abelard et al. | ................. | 386/94 |
| 2007/0074267 A1* | 3/2007 | Clerget et al. | ................. | 725/136 |
| 2007/0147384 A1* | 6/2007 | Pekonen et al. | ............. | 370/394 |
| 2007/0147409 A1* | 6/2007 | Kallio et al. | ................... | 370/431 |

OTHER PUBLICATIONS

European Search Report.
Digital Video Broadcasting: "IP Datacast over DVB-H: Service Purchase and Protection (SPP)" Dec. 2005.
Digital Video Broadcasting: "DVB-H Implementation Guidelines" Nov. 2005.
Digital Video Broadcasting "IP Datacast over DVB-H: Architecture" Nov. 2005.

* cited by examiner

*Primary Examiner* — Dwayne Bost
*Assistant Examiner* — Myron Wyche
(74) *Attorney, Agent, or Firm* — Harness, Dickey & Pierce, P.L.C.

(57) ABSTRACT

A first variant of the process includes receiving an encrypted stream representing a service, this stream comprising a data channel and an ECM channel; slicing the stream to send it in packets to a mobile receiver; extracting the control message channel of this stream; forming a block containing the data channel, compatible with the diffusion to the receiver; extracting from the sliced stream a control message and introducing the control message into the block, in order to form a packet. A second variant of the process includes receiving an encrypted stream, this stream comprising a data channel and an ECM channel; cutting the stream; forming a block from the stream, comprising the data channel and the ECM channel, compatible with the diffusion to receivers; determining identical messages of the ECM channel repeated in the block and eliminating identical repeated messages, while conserving at least one of the identical messages.

12 Claims, 1 Drawing Sheet

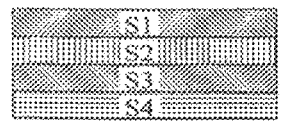
FIG. 1 (PRIOR ART)
FIG. 2 (PRIOR ART)
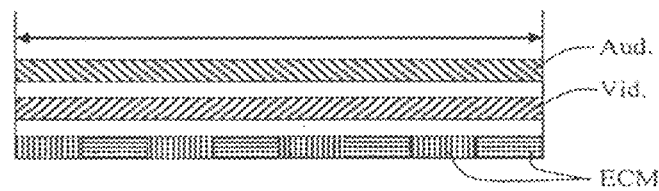
FIG. 3 (PRIOR ART)
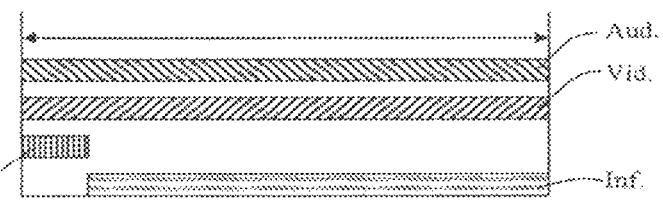
FIG. 4
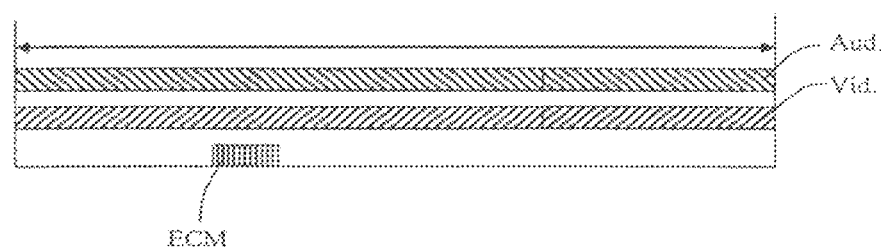
FIG. 5

PROCESS FOR THE GENERATION OF PACKETS FOR AT LEAST ONE MOBILE RECEIVER

FIELD OF THE INVENTION

The present invention generally relates to the transmission of contents intended for mobile receivers. These contents can in particular, but not exclusively be Pay-TV events, audio contents, games, software or information such as weather forecasts, stock-exchanges information or the like.

The receivers concerned can in particular be mobile telephones, personal digital assistants (PDA), portable computers, receivers intended to be placed in vehicles or any mobile receiver developed for an application using the contents indicated above.

More particularly, the invention concerns a generation method for packets intended for at least one mobile receiver.

PRIOR ART

Within the scope of the broadcast of content as defined above and in particular of content for conditional access television intended for mobile receivers, known under the acronym DVB-H (Digital Video Broadcast-Handheld), the contents are sent cyclically in the form of packets (known under the term Time Slices). The packets correspond to services. A service can be defined as one or several digital streams forming a subset of the global digital stream. This subset shares common identification data in such a way that it is possible to create an event from this identification data. The data of the packets is generally enciphered so that it is necessary to acquire a key to be able to access the content. This key, as well as possibly other data such as access conditions for example, is sent in a control message ECM contained in the packets themselves.

In the domain of DVB-H as in that of terrestrial digital television DVB-T (Digital video broadcasting-terrestrial) the control messages ECM are broadcast in a repetitive way, so that this type of message can quickly reach its recipient. A repetition frequency typical of this type of messages is one control message every 50 ms.

When the repetition frequency of the messages is large, the number of control message to be broadcast is also large. These messages occupy a large bandwidth.

When mobile receivers are used that work with batteries, the energy consumption problem is particularly notable. In fact, in order to ensure maximum autonomy for the receiver, it is useful to try to reduce energy consumption to a strict minimum. In other words, it is essential to process as little unnecessary information as possible.

In the systems of the prior art, each packet contains, in addition to the audio/video content corresponding to an event, a certain number of items of information that allow the receiver to access the content and visualise the event continuously. These items of information are in particular, as previously indicated, an identifier of the control messages ECM.

Since the content is sent in the form of packets burst and not in a continuous stream, as in the case of DVB-T, when a user changes channel, he/she must wait for the reception of a packet related to the service concerned and then the processing of this packet in order to be able to access this new channel. The waiting time is conditioned by the data sending cycle time for each service. This waiting time is independent of the repetition frequency of the control messages ECM. Given the large number of control messages ECM in each packet, the bandwidth is uselessly consumed.

DISCLOSURE OF THE INVENTION

This invention proposes to avoid the drawbacks of the methods of the prior art by realizing a method in which the bandwidth is used optimally, namely each data packet contains a maximum amount of useful data and a minimum amount of unnecessary data. This also allows improved energy consumption since the same quantity of energy is consumed to process a larger quantity of useful information. Since energy management is an essential point in the domain of DVB-H, this optimisation of the content of the packets is of fundamental importance in this domain.

The aim of the invention is achieved by means of a method for generation of packets intended for at least one mobile receiver, comprising the following steps:

reception of an encrypted stream representing a service, this stream comprising at least a data channel and a control message ECM channel, slicing of said stream in order to send it in packets to the mobile receiver, extraction of the control message channel of this sliced stream, formation of a block comprising at least the data channel compatible with the broadcast to said mobile receiver, extraction from said sliced stream of at least one control message from the control message channel, introduction of said extracted control message into the block in such a way as to form a packet.

The aim of the present invention is also achieved by means of a method for generating packets intended for at least one mobile receiver, comprising the following steps:

reception of an encrypted stream representing a service, this stream comprising at least a data channel and a control message channel ECM, slicing said stream in order to send it in packets to the mobile receiver, extraction of the control message channel of this sliced stream, formation of a block comprising at least the data channel compatible with the broadcast to said mobile receiver, determination of the identical messages of the control message channel repeated in said block, elimination of at least some of said identical repeated messages, while keeping at least one of said identical repeated messages.

The solution proposed by the present invention consists in generating packets that do not contain any unnecessary data. In particular the data that is only used once does not appear several times in each packet.

According to this invention, two embodiments are essentially possible. According to one of the embodiments, the packets are formed as in the systems of the prior art. The redundant data is then eliminated. According to another embodiment, the redundant data is not used during the formation of a packet. Only the data indispensable for allowing access to the content is used.

BRIEF DESCRIPTION OF THE DRAWINGS

This invention and its advantages will be better understood with reference to the annexed Figures and to the detailed description of particular embodiments, in which:

FIG. 1 shows the data corresponding to different services, in the form of continuous streams;

FIG. 2 shows this same data in the form of packets;

FIG. 3 represents the content of one of the packets in FIG. 2 according to the prior art;

FIG. 4 represents the content of one of the packets in FIG. 2 according to a first embodiment of the invention; and FIG. 5 represents the content of one of the packets in FIG. 2 according to a second embodiment of the invention

EMBODIMENTS OF THE INVENTION

FIG. 1 shows schematically the contents in the form of continuous streams. In the context of the invention, contents such as Pay-TV events, audio contents, games, software or information such as weather forecasts, stock-exchange information or the like are broadcast by content suppliers. In the invention, these contents are intended for mobile receivers such as mobile telephones, personal digital assistants (PDA), portable computers, receivers to be placed in vehicles or any mobile receiver developed for an application using the content indicated above. These mobile receivers are connected to a management centre which is in particular responsible for the management of the access rights, subscriptions, content enciphering keys, etc. The content suppliers and the management centre can be related with the same entity or can be distinct entities.

In a well known method, as disclosed in FIG. 2, the contents broadcast to mobile receivers are not generally broadcast continuously, but rather in the form of data packets. These packets are divided into different services, marked S1, S2, S3 and S4 in FIGS. 1 and 2. Each packet corresponds to a channel or a service. The packets are broadcast cyclically according to a cycle time generally comprised between 2 and 5 seconds in practice. Each packet contains the quantity of information corresponding to the cycle time chosen. As an example, in the case of the diffusion of a Pay-TV event, imagine that the cycle time is equal to 4 seconds. The first packet marked S1 in FIG. 2 contains data corresponding to 4 seconds when this is displayed on the mobile receiver. After this cycle time, a second cycle is repeated by means of the diffusion of the content related to service 1, and also containing the equivalent of 4 visualisation seconds. The transmission duration of a packet can be comprised between approximately 0.1 and 0.5 seconds in practice. These cycle and effective transmission times of each service are all statically and/or dynamically configurable.

When the receiver stops on the service S1, it receives each packet related to this service. It does not receive the others packets related to the content of other services, in such a way that it can be placed on stand-by during the transmission of the packets related to the other services S2, S3, .... According to a practical example, this embodiment allows an energy saving of up to 90%.

FIG. 3 represents the detail of the content of a packet such as represented in FIG. 2. This packet could be, for example, one of those marked S1. According to an embodiment corresponding to the prior art, a packet used in particular in the domain of Pay-TV contains audio data, marked Aud. in FIGS. 3 to 5, video data, marked Vid. in these Figures, and control messages ECM. These control messages themselves contain, keys allowing access to the audio/video content. These messages are thus essential for the visualisation of a content. In order to allow rapid access to an enciphered content during a service change, the suppliers of Pay-TV content send these messages frequently and regularly. As a specific example, even if the keys contained in such a control message ECM have a validity duration comprised between 1 and 30 seconds, these control messages are sent for example every 50 ms.

Therefore, in a conventional system, during a channel or service change, it is only necessary to wait a very short time until the reception of the next control message ECM to be able to access the content.

FIGS. 4 and 5 illustrate the content of a packet, according to two different embodiments of the invention. In FIG. 4, among all control messages ECM contained in a packet, only one is necessary. In fact, unlike the conventional Pay-TV systems, in which the data is sent in the form of a continuous stream, in the domain of the DVB-H it is necessary and sufficient for each packet to have at least one control message ECM. In this way, when a service is changed by a user, before having access to this service it is in any case necessary to wait for the reception of a complete packet for the new service required. The fact that there are several control messages in the same packet does not therefore allow the acceleration of access to data.

According to a first variant of the method of the invention, in a first instance, the packets are processed conventionally, namely the continuous audio and video contents such as those represented in FIG. 1 are divided into blocks in order to form a discreet audio/video content. The control messages are also processed in a conventional way, namely these messages are generated according to a large frequency with respect to their validity duration.

The content of the packet is then analysed in order to determine which are the redundant messages. A part of these redundant messages is then eliminated in such a way that at least one of these messages remains present in the packet. It is possible to keep more than one copy of the redundant message, for example for security reasons. The elimination of these messages leaves a certain amount of space in the packet. As an example, if a packet allows access to 4 seconds of content and the control messages ECM are usually sent every 50 ms, there are 80 messages per packet. 79 of these messages can be eliminated. The space obtained in this way can be used for other information, for example auxiliary information related to the service. Such information can in particular be teletext, subtitles, a news ticker or metadata. This information is marked Inf. in FIG. 4.

In the embodiment in FIG. 5, the packet is not processed in a conventional way. In this embodiment, the packets are formed without a control message ECM. A unique control message, or possibly, for reliability reasons, a small number of control messages is then inserted into the packet. The size of the audio Aud. and video Vid. data introduced into a packet is such that the total size of the audio data, video data and of the control message corresponds to the normal size of the packets. In this case, the available space obtained thanks to the elimination of the redundant control messages is used for an audio/video content.

In FIG. 4, the control message ECM is placed at the start of the packet, while in FIG. 5, it is placed in any position. In certain systems, the placement of the control message at the start of the packet is a requirement. In fact, in these systems, the deciphering of the control message is a precondition to the deciphering of the content. If this control message is not deciphered in the first place, the content is simply not accessible.

However, in other systems the control message can be placed in any position in the packet, without posing any particular problem. The packet is processed globally. It is thus sufficient for the control message to be present in order for the packet to be processed.

This invention is interesting given the fact that the content of a packet is optimised, both by adding supplementary information with respect to the traditional content, as well as by adding the audio-video content without increasing the size of a packet.

Therefore, for the same amount of energy consumed, the user receives a greater quantity of information.

The invention claimed is:

1. A method of generating at least one packet sent from a content supplier to at least one mobile receiver, the method comprising:
   receiving, in a management center, a continuous stream of at least one service, the continuous stream including at least a data channel and a control message channel, the control message channel including a plurality of control messages;
   slicing the continuous stream into blocks in the management center;
   extracting the control message channel from the sliced stream;
   extracting the data channel from the sliced stream;
   extracting, from said sliced stream, at least one of said plurality of control messages from the control message channel;
   forming a packet including at least the data channel of the sliced stream and the at least one of said plurality of control messages; and
   transmitting the at least one packet from the management center to the at least one mobile receiver.

2. The method according to claim 1, wherein said packet includes at least an audio/video content.

3. The method according to claim 1, wherein said packet further includes auxiliary information such as teletext, subtitles, a news ticker or metadata.

4. A method of generating at least one packet transmitted by a content supplier to at least one mobile receiver, the method comprising:
   receiving, in a management center, a continuous stream of at least one service, the continuous stream including at least one data channel and at least one control message channel, the at least one control message channel including a plurality of control messages;
   slicing said continuous stream into blocks in said management center,
   forming, from said sliced stream, the at least one packet including at least one block of the at least one data channel and at least one block of the at least one control message channel,
   analyzing the at least one packet and determining repeated identical control messages included in the at least one block of the at least one control message channel,
   eliminating at least one of said repeated identical control messages such that at least one control message of the repeated identical messages remains in the at least one packet; and
   transmitting said at least one packet to the at least one mobile receiver.

5. The method according to claim 4, wherein the at least one data channel includes an audio/video content.

6. The method according to claim 4, wherein the eliminated at least one control message is replaced by a content.

7. The method according to claim 6, wherein said content is an audio/video content.

8. The method according to claim 6, wherein said content includes auxiliary information such as teletext, subtitles, a news ticker or meta-data.

9. The method according to claim 4, wherein the at least one control message is placed at a start of the at least one packet.

10. The method according to claim 4, wherein the at least one control message is placed in any position in the packet.

11. The method according to claim 1, wherein the at least one packet contains auxiliary information.

12. The method according to claim 6, wherein said content is formed by auxiliary information.

* * * * *